US008637141B2

(12) United States Patent
Gemici et al.

(10) Patent No.: US 8,637,141 B2
(45) Date of Patent: Jan. 28, 2014

(54) COATINGS (75) Inventors: Zekeriyya Gemici, Cambridge, MA (US); Michael F. Rubner, Westford, MA (US); Robert E. Cohen, Jamaica Plain, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 507 days.

(21) Appl. No.: 12/473,803

(22) Filed: May 28, 2009

(65) Prior Publication Data

US 2009/0324910 A1 Dec. 31, 2009

Related U.S. Application Data (60) Provisional application No. 61/061,806, filed on Jun. 16, 2008.

(51) Int. Cl.
*B32B 7/02* (2006.01)
*B32B 3/26* (2006.01)
*B32B 27/00* (2006.01)

(52) U.S. Cl.
USPC ............ 428/212; 428/304.4; 428/305.5; 428/319.9

(58) Field of Classification Search
None
See application file for complete search history.

(56) References Cited

U.S. PATENT DOCUMENTS

| 6,723,392 | B1 * | 4/2004 | Jinnai et al. ............ 428/1.1 |
| 2003/0215626 | A1 | 11/2003 | Hiller et al. | |
| 2005/0095699 | A1 | 5/2005 | Miyauchi et al. | |
| 2006/0029634 | A1 | 2/2006 | Berg et al. | |
| 2006/0029808 | A1 | 2/2006 | Zhai et al. | |
| 2007/0104922 | A1 | 5/2007 | Zhai et al. | |
| 2007/0166513 | A1 * | 7/2007 | Sheng et al. ............ 428/141 |
| 2008/0038458 | A1 | 2/2008 | Gemici et al. | |
| 2009/0002615 | A1 * | 1/2009 | Fujii et al. ............ 349/123 |
| 2009/0142561 | A1 * | 6/2009 | Zhang et al. ............ 428/212 |

FOREIGN PATENT DOCUMENTS

| WO | WO 2005/096066 | 10/2005 |
| WO | WO 2008/021817 | 2/2008 |

OTHER PUBLICATIONS

Shi et al., Journal of Materials Science Letters, 16 (1997), pp. 1284-1285.*
Definition of "capillary interstices": http://www.speleogenesis.info/directory/glossary/?term=capillary%20interstice.*
Ahn, J. S.; Hammond, P. T.; Rubner, M. F.; Lee, I. *Colloids and Surfaces A: Physicochem. Eng. Aspects* 2005, 259, 45.
Bico, J.; et al. *Europhysics Letters* 1999, 47, (6), 743-744.
Bico, J.; et al., D. *Europhysics Letters* 2001, 55, (2), 214-220.
Bogdanvic, G.; et al. *J. Colloids Interface Science* 2002, 255, 44.
Cassie, A. B. D.; Baxter, S. *Trans. Faraday Soc.* 1944, 40, 546.
Fery et al., Langmuir 2001, 17, 3779.
G. Decher, Science 1997, 277, 1232.
Gao, Y. F.; et al. *Langmuir* 2004, 20, (8), 3188-3194.
Gemici, Z.; Shimomura, H.; Cohen, R. E.; Rubner, M. F. Langmuir 2008, 24, 2168-2177.

(Continued)

*Primary Examiner* — David Sample
*Assistant Examiner* — Nicole T Gugliotta
(74) *Attorney, Agent, or Firm* — Steptoe & Johnson LLP (57) ABSTRACT

A superhydrophilic coating can be antireflective and antifogging. The coating can remain antireflective and antifogging for extended periods. The coating can have a graded refractive index. The coating for wafer-level optics can be for targeted capillary condensation in nanoparticle containing reflow-compatible coatings.

5 Claims, 9 Drawing Sheets

(56) References Cited

OTHER PUBLICATIONS

Hattori, H. *Adv. Mater.* 2001, 13, 51.
Hiller, J.; Mendelsohn, J.; Rubner, M. F. *Nature Mater.*, 2002, 1, 59.
Kommireddy, D. S.; et al. *J. Nanosci. Nanotechnol.* 2005, 5, 1081.
Koo, H. Y.; et al. *Adv. Mater.* 2004, 16, 274.
Lvov, Y.; Ariga, K.; Onda, M.; Ichinose, I.; Kunitake, T. *Langmuir* 1997, 13, (23), 6195-6203.
McHale, G.; Shirtcliffe, N. J.; Aqil, S.; Perry, C. C.; Newton, M. I. *Physical Review Letters* 2004, 93, (3), 036102.
Mendelsohn et al., Langmuir 2000, 16, 5017.
Rouse, J. H.; Ferguson, G. S. *J. Am. Chem. Soc.* 2003, 125, 15529.
Sennerfors, T.; et al. *Langmuir* 2002, 18, 6410.
Shiratori et al., Macromolecules 2000, 33, 4213.
Soeno, T. et al. *Transactions of the Materials Research Society of Japan* 2003, 28, 1207.
Sun, T. L.; et al. *Angewandte Chemie-International Edition* 2004, 43, (3), 357-360.
Unger, K. K., *Porous silica: its properties and use as support in column liquid chromatography.* Elsevier Scientific Pub. Co.: Amsterdam; New York, 1979; p. xi, 336.
Wenzel, R. N. *Ind. Eng. Chem.* 1936, 28, 988.
Wenzel, R. N. *J. Phys. Colloid Chem.* 1949, 53, 1466.
Zhang, X. et al. *J. Am. Chem. Soc.* 2004, 126, 3064.
Zhang, X-T.; et al. *Chem. Mater.* 2005, 17, 696.
Seonmin Kim, et al., "Capillary Condensation onto Titania ($TiO_2$) Nanoparticle Agglomerates," *Langmuir*, vol. 23, No. 5, Feb. 1, 2007, pp. 2497-2504, XP55012882.

\* cited by examiner

COATINGS

CLAIM OF PRIORITY

This application claims priority to provisional U.S. patent application No. 61/061,806 filed on Jun. 16, 2008, which is hereby incorporated by reference in its entirety.

EDERALLY SPONSORED RESEARCH OR DEVELOPMENT

This invention was made with government support under Grant No. DMR0213282 awarded by the National Science Foundation. The government has certain rights in this invention.

TECHNICAL FIELD

This invention relates to coatings.

BACKGROUND

Multilayers of polyelectrolytes and/or nanoparticles can be easily assembled on a variety of surfaces. Selection of the materials, assembly conditions, and post-processing conditions can be used to control the chemical, structural and optical properties of the final product.

SUMMARY

Nanoparticles and polymers can be combined in conformal, graded-index, organic-inorganic composite antireflective coatings with remarkable optical performance on glass and epoxy substrates, using layer-by-layer (LbL) assembly. The refractive index grading can be enhanced by differentially adsorbing a material (and entraining the material) in nanopores as a function of the effective capillary radius. Stable antireflective (AR) coatings can be formed from layer-by-layer assembled films including nanoparticles and polyelectrolytes.

In one aspect, a surface includes a nanoporous coating including a first thickness having a first porosity and a second thickness having a second porosity different from the first porosity.

The first thickness can include a first plurality of nanoparticles having a first diameter. The second thickness can include a second plurality of nanoparticles having a second diameter different from the first diameter. The coating can have a thickness of less than 500 nm, or less than 300 nm. The surface can be transparent.

The surface can include a first functionalizing compound present in the first porosity as a capillary condensate. The first functionalizing compound can be substantially absent from the second porosity. The surface can include a second functionalizing compound present in the second porosity as a capillary condensate. The first and second functional compounds can be different.

In another aspect, a method of coating a surface includes placing a first plurality of nanoparticles having a first diameter on a substrate, and placing a second plurality of nanoparticles having a second diameter different from the first diameter on the substrate.

The method can include exposing the first plurality of nanoparticles to a first functional moiety. The method can include exposing the second plurality of nanoparticles to a second functional moiety. The first and second functional moieties can be different.

In another aspect, a method of coating a surface includes placing on a substrate a first thickness of a first material having a first refractive index, placing on the substrate a second thickness of a second material having a second refractive index, and exposing the first material and second materials to a functional moiety.

The method can include selecting a first material including a plurality of nanoparticles having a first size. The first size can be selected on the basis of a desired first refractive index. The method can include selecting a second material including a plurality of nanoparticles having a second size. The second size can be selected on the basis of a desired second refractive index.

In another aspect, a method of coating a surface includes selecting a first plurality of nanoparticles capable of forming capillary interstices having a first desired capillary radius, $r_{C1}$; forming a coating on a substrate, the coating including the first plurality of nanoparticles; and exposing the coating to a vapor of a functionalizing compound capable of forming a capillary condensate in capillary interstices having the first desired capillary radius, $r_{C1}$.

The method can include selecting the functionalizing compound capable of forming a capillary condensate in capillary interstices having the first desired capillary radius, $r_{C1}$.

The method can include selecting a second plurality of nanoparticles capable of forming capillary interstices having a second desired capillary radius, $r_{C2}$. The first plurality of nanoparticles, the second plurality of nanoparticles, and the functionalizing compound can be selected such that the functionalizing compound is capable of forming a capillary condensate in capillary interstices having the first desired capillary radius, $r_{C1}$, but is substantially incapable of forming a capillary condensate in capillary interstices having the second desired capillary radius, $r_{C2}$.

In another aspect, a surface includes a nanoporous coating including a preselected porosity and a preselected functionalizing compound, the functionalizing compound being capillary-condensed within the porosity.

The nanoporous coating can include a plurality of inorganic nanoparticles having capillary interstices among the nanoparticles. The functionalizing compound can be a polymer or a polymer precursor.

In particular, the coating can be prepared in a manner that results in a liquid condensing in selected capillary spaces within the coating. The condensate forms only in small capillary spaces, and does not fill all available porous spaces. The liquid is introduced to the coating by exposing the coating to a vapor of the liquid. A capillary condensate is not formed by allowing the liquid to contact the coating by imbibition or infiltration. The vapor penetrates porous spaces of the coating and can condense in desired capillary spaces. Location of the condensate within the coating is controlled by selecting the materials and properties of the coating.

The details of one or more embodiments are set forth in the accompanying drawings and the description below. Other features, objects, and advantages will be apparent from the description and drawings, and from the claims.

DETAILED DESCRIPTION

Many surfaces, frequently transparent surfaces, benefit from the presence of an antireflective coating. Desirably, the coating is robust, thin, and optically clear. For manufacturing purposes, the coating can desirably be assembled on a variety of materials rapidly, without a need for complex equipment, and is formed conformally on complex surfaces. In some embodiments, the coating can be antifogging as well as antireflective. In certain circumstances, the coating can be hydrophilic, hydrophobic, superhydrophilic, or superhydrophobic.

An antireflective coating can be a thin coating with a graded refractive index profile. In other words, the coating can have a refractive index that varies as a function of thickness. A graded refractive index profile can provide a gradual transition in refractive index from one medium (e.g., that of the substrate supporting the coating) to another medium (e.g., that of air). The refractive index profile can be smooth or stepped. The refractive index in different regions of the coating (e.g., at different points across the thickness of the coating) can be controlled, for example, by controlling porosity of a porous layer, by functionalization of one or more layers, or a combination of these methods.

Surfaces having a nanotexture can exhibit extreme wetting properties. A nanotexture refers to surface features, such as ridges, valleys, or pores, having nanometer (i.e., typically less than 1 micrometer) dimensions. In some cases, the features will have an average or rms dimension on the nanometer scale, even though some individual features may exceed 1 micrometer in size. The nanotexture can be a 3D network of interconnected or isolated pores. Depending on the structure and chemical composition of a surface, the surface can be hydrophilic, hydrophobic, or at the extremes, superhydrophilic or superhydrophobic. One method to create the desired texture is with a polyelectrolyte multilayer. Polyelectrolyte multilayers can also confer desirable optical properties to surfaces, such as anti-reflectivity, or reflectivity in a desired range of wavelengths. See, for example, U.S. Patent Application Publication Nos. 2003/0215626, and 2006/0029634, each of which is incorporated by reference in its entirety.

Textured surfaces can promote extreme wetting behavior. Early theoretical work by Wenzel and Cassie-Baxter and more recent studies by Quéré and coworkers suggest that it is possible to significantly enhance the wetting of a surface with water by introducing roughness at the right length scale. See, for example, Wenzel, R. N. *J. Phys. Colloid Chem.* 1949, 53, 1466; Wenzel, R. N. *Ind. Eng. Chem.* 1936, 28, 988; Cassie, A. B. D.; Baxter, S. *Trans. Faraday Soc.* 1944, 40, 546; Bico, J.; et al., D. *Europhysics Letters* 2001, 55, (2), 214-220; and Bico, J.; et al. *Europhysics Letters* 1999, 47, (6), 743-744, each of which is incorporated by reference in its entirety. Building on this work, it has recently been demonstrated that both lithographically textured surfaces and microporous surfaces can be rendered superhydrophilic. See, e.g., McHale, G.; Shirtcliffe, N. J.; Aqil, S.; Perry, C. C.; Newton, M. I. *Physical Review Letters* 2004, 93, (3), which is incorporated by reference in its entirety. The intriguing possibility of switching between a superhydrophobic and superhydrophilic state has also been demonstrated with some of these surface structures. See, for example, Sun, T. L.; et al. *Angewandte Chemie-International Edition* 2004, 43, (3), 357-360; Gao, Y. F.; et al. *Langmuir* 2004, 20, (8), 3188-3194; and U.S. Patent Application Publication Nos. 2006/0029808, 2007/0104922, and 2008/0038458, each of which is incorporated by reference in its entirety.

Layer-by-layer processing of polyelectrolyte multilayers can be used to make conformal thin film coatings with molecular level control over film thickness and chemistry. Charged polyelectrolytes can be assembled in a layer-by-layer fashion. In other words, positively- and negatively-charged polyelectrolytes can be alternately deposited on a substrate. One method of placing the polyelectrolytes can include depositing the polyelectrolytes is to contact the substrate with an aqueous solution of polyelectrolyte at an appropriate pH. The pH can be chosen such that the polyelectrolyte is partially or weakly charged. The multilayer can be described by the number of bilayers it includes, a bilayer resulting the sequential application of oppositely charged polyelectrolytes. For example, a multilayer having the sequence of layers PAH-PAA-PAH-PAA-PAH-PAA would be said to be made of three bilayers.

These methods can provide a new level of molecular control over the deposition process by simply adjusting the pH of the processing solutions. A nonporous polyelectrolyte multilayer can form porous thin film structures induced by a simple acidic, aqueous process. Tuning of this pore forming process, for example, by the manipulation of such parameters as salt content (ionic strength), temperature, or surfactant chemistry, can lead to the creation of micropores, nanopores, or a combination thereof. A nanopore has a diameter of less than 150 nm, for example, between 1 and 120 nm or between 10 and 100 nm. A nanopore can have diameter of less than 100 nm. A micropore has a diameter of greater than 150 nm, typically greater than 200 nm. Selection of pore forming conditions can provide control over the porosity of the coating. For example, the coating can be a nanoporous coating, substantially free of micropores. Alternatively, the coating can be a microporous coating having an average pore diameters of greater than 200 nm, such as 250 nm, 500 nm, 1 micron, 2 microns, 5 microns, 10 microns, or larger.

The properties of weakly charged polyelectrolytes can be precisely controlled by changes in pH. See, for example, G. Decher, Science 1997, 277, 1232; Mendelsohn et al., Langmuir 2000, 16, 5017; Fery et al., Langmuir 2001, 17, 3779; Shiratori et al., Macromolecules 2000, 33, 4213; and U.S. Patent Application Publication Nos. 2003/0215626 and 2007/0104922, each of which is incorporated by reference in its entirety. A coating of this type can be applied to any surface amenable to the water based layer-by-layer (LbL) adsorption process used to construct these polyelectrolyte multilayers. Because the water based process can deposit polyelectrolytes wherever the aqueous solution contacts a surface, even the inside surfaces of objects having a complex topography can be coated. In general, a polyelectrolyte can be applied to a surface by any method amenable to applying an aqueous solution to a surface, such as dipping or spraying.

Surfaces with extreme wetting behavior can be fabricated from a polyelectrolyte coating. See, for example, U.S. Patent Application Publication No. 2006/0029808 and 2007/0104922, each of which is incorporated by reference in its entirety. A polyelectrolyte has a backbone with a plurality of charged functional groups attached to the backbone. A polyelectrolyte can be polycationic or polyanionic. A polycation has a backbone with a plurality of positively charged functional groups attached to the backbone, for example poly (allylamine hydrochloride). A polyanion has a backbone with a plurality of negatively charged functional groups attached to the backbone, such as sulfonated polystyrene (SPS) or poly (acrylic acid), or a salt thereof. Some polyelectrolytes can lose their charge (i.e., become electrically neutral) depending on conditions such as pH. Some polyelectrolytes, such as copolymers, can include both polycationic segments and polyanionic segments.

Surfaces with extreme wetting behavior can be created from multilayer films. Such conformable surfaces can be used in, for example, antireflective or antifogging applications.

Multilayer thin films containing nanoparticles of $SiO_2$ can be prepared via layer-by-layer assembly (see Lvov, Y.; Ariga, K.; Onda, M.; Ichinose, I.; Kunitake, T. Langmuir 1997, 13, (23), 6195-6203, which is incorporated by reference in its entirety). Other studies describe multilayer assembly of $TiO_2$ nanoparticles, $SiO_2$ sol particles and single or double layer nanoparticle-based anti-reflection coatings. See, for example, Zhang, X-T.; et al. Chem. Mater. 2005, 17, 696; Rouse, J. H.; Ferguson, G. S. J. Am. Chem. Soc. 2003, 125, 15529; Sennerfors, T.; et al. Langmuir 2002, 18, 6410; Bogdanvic, G.; et al. J. Colloids Interface Science 2002, 255, 44; Hattori, H. Adv. Mater. 2001, 13, 51; Koo, H. Y.; et al. Adv. Mater. 2004, 16, 274; and Ahn, J. S.; Hammond, P. T.; Rubner, M. F.; Lee, I. Colloids and Surfaces A: Physicochem. Eng. Aspects 2005, 259, 45, each of which is incorporated by reference in its entirety. Incorporation of $TiO_2$ nanoparticles into a multilayer thin film can improve the stability of the superhydrophilic state induced by light activation. See, e.g., Kommireddy, D. S.; et al. J. Nanosci. Nanotechnol. 2005, 5, 1081, which is incorporated by reference in its entirety.

Broadband antireflectivity can be attained using an inexpensive, simple process employing aqueous solutions of polymers. See, for example, U.S. Patent Application Publication Nos. 2003/0215626 and 2007/0104922, each of which is incorporated by reference in its entirety. The process can be used to apply a high-efficiency conformal antireflective coating to virtually any surface of arbitrary shape, size, or material. The process can be used to apply the antireflective coating to more than one surface at a time and can produce coatings that are substantially free of pinholes and defects, which can degrade coating performance. The porous polymeric material can be antireflective. The process can be used to form antireflective and antiglare coatings on polymeric substrates. The simple and highly versatile process can create molecular-level engineered conformal thin films that function as low-cost, high-performance antireflection and antiglare coatings. The method can uniformly coat both sides of a substrate at once to produce defect and pinhole-free transparent coatings. The process can be used to produce high-performance polymeric optical components, including flat panel displays and solar cells.

Similarly, the polymer coating can be an antifogging coating. The antifogging coating can prevent condensation of light-scattering water droplets on a surface. By preventing the formation of light-scattering water droplets on the surface, the coating can help maintain optical clarity of a transparent surface, e.g., a lens, a window or display screen. The coating can be both antireflective and antifogging. A surface of a transparent object having the antifogging coating maintains its transparency to visible light when compared to the same object without the antifogging coating under conditions that cause water condensation on the surface.

Polyelectrolyte multilayer films have been used as templates to provide the surface roughnesses of superhydrophobic surfaces. A layer-by-layer process was used to assemble a polyelectrolyte multilayer containing $SiO_2$ nanoparticles. The film was then heated to 650° C. to remove the polyelectrolytes and create the surface texture needed for superhydrophobic behavior (see Soeno, T. et al. Transactions of the Materials Research Society of Japan 2003, 28, 1207, which is incorporated by reference in its entirety). In another example, dendritic gold clusters were electrochemically deposited onto indium tin oxide (ITO) electrodes covered with a polyelectrolyte multilayer film. After the deposition of a n-dodecanethiol monolayer on the gold clusters, the surface showed superhydrophobic behavior (see Zhang, X. et al. J. Am. Chem. Soc. 2004, 126, 3064, which is incorporated by reference in its entirety). The electrochemical deposition process used to create these films can limit the types of materials that this method can be used to form a superhydrophobic coating on.

A high roughness polyelectrolyte multilayer can be formed by forming the polyelectrolyte multilayer over a high roughness surface. When the polyelectrolyte multilayer is formed over a high roughness surface, a treatment to increase the roughness of the polyelectrolyte multilayer can be optional. The high roughness surface can include, for example: particles, such as microparticles or microspheres; nanoparticles or nanospheres; or an area of elevations, ridges or depressions. The micrometer scale particles can be, for example, particles of a clay or other particulate material. Elevations, ridges or depressions can be formed, for example, by etching, placing or otherwise depositing micrometer scale particles, or photolithography on a suitable substrate.

A lock-in step can prevent further changes in the structure of the porous multilayer. The lock-in can be achieved by, for example, exposure of the multilayer to chemical or thermal polymerization conditions. The polyelectrolytes can become cross-linked and unable to undergo further transitions in porosity. In some cases, chemical crosslinking step can include treatment of a polyelectrolyte multilayer with a carbodiimide reagent. The carbodiimide can promote the formation of crosslinks between carboxylate and amine groups of the polyelectrolytes. A chemical crosslinking step can be preferred when the polyelectrolyte multilayer is formed on a substrate that is unstable at temperatures required for crosslinking (such as, for example, when the substrate is polystyrene). The crosslinking step can be a photocrosslinking step. The photocrosslinking can use a sensitizer (e.g., a light-sensitive group) and exposure to light (such as UV, visible or IR light) to achieve crosslinking. Masks can be used to form a pattern of crosslinked and non-crosslinked regions on a surface. Other methods for crosslinking polymer chains of the polyelectrolyte multilayer are known.

Nanoparticles can be applied to the multilayer, to provide a nanometer-scale texture or roughness to the surface. The nanoparticles can be nanospheres such as, for example, silica nanospheres, titania nanospheres, polymer nanospheres (such as polystyrene nanospheres), or metallic nanospheres. The nanospheres can be dense or hollow. The nanoparticles can be metallic nanoparticles, such as gold or silver nanoparticles. The nanoparticles can have diameters of, for example, between 1 and 1000 nanometers, between 10 and 500 nanometers, between 20 and 100 nanometers, or between 1 and 100 nanometers. The intrinsically high wettability of silica nanoparticles and the rough and porous nature of the multilayer surface establish favorable conditions for extreme wetting behavior.

Superhydrophilic coatings can be created from multilayers without the need for treating the multilayer to induce a porosity transition. For example, the multilayer can include a polyelectrolyte and a plurality of hydrophilic nanoparticles. See, for example, U.S. Patent Application Publication No. 2007-0104922, which is incorporated by reference in its entirety. By choosing appropriate assembly conditions, a 3D nanoporous network of controllable thickness can be created with the nanoparticles. The network can be interconnected—in other words, the nanopores can form a plurality of connected voids. Rapid infiltration (nano-wicking) of water into this network can drive the superhydrophilic behavior.

A multilayer coating including nanoparticles can be prepared with arbitrary grading of particle (and therefore pore) size distribution across the coating thickness. Pore size can be determined by particle packing; thus, particle size and particle size distribution (polydispersity) greatly influence pore and capillary size. The graded pore size distribution results in a coating having a graded index of refraction across the coating thickness. In some embodiments, the coating can be functionalized; in particular, the coating can be differently functionalized at different depths across the coating thickness. The differential functionalization can be controlled, for example, by controlling the local particle (and therefore pore) size distribution in the coating, and the capillary radius, which is also influenced by particle size and polydispersity.

The functionalizing moiety can be a small molecule (such as, e.g., water, solvents, monomers such as an acrylate, methacrylate, diacrylate, dimethacrylate, epoxy, urethanes, isocyanates, thiocyanates, sytrenics, or the like) or a polymer (for example, PDMS, acrylate-terminated PDMS, methacrylate-terminated PDMS, diacrylate-terminated PDMS, dimethacrylate-terminated PDMS, diacrylate-terminated polyurethane, dimethacrylate-terminated poly(ethylene oxide) or any polymer with or without crosslinkable groups at the chain ends, or the like). The moiety can be with or without reactive side groups. The moiety can associate with a nanoparticle surface so as to form a monolayer, or a thicker layer. The association between the moiety and the nanoparticle surface may be ionic, covalent, physisorption-based, or chemisorption-based. The method of coating assembly and the method of functionalization can be independent, and can be used separately if desired. The functionalization can be selected so as to result in different extents of capillary condensation as a function of pore size and capillary radius.

Both electrostatically-mediated and reactive LbL assembly methods can be used to prepare the coatings. Many different types and sizes of nano-materials can be incorporated into layer-by-layer assembled films. In one example, polycationic poly(allylamine hydrochloride) (PAH) can be assembled electrostatically with negatively charged silica nanoparticles 8-50 nm in diameter. Both species can be prepared as dilute aqueous solutions, the coating can be formed by repeated alternated dipping of a substrate in the two solutions.

Figure 1:
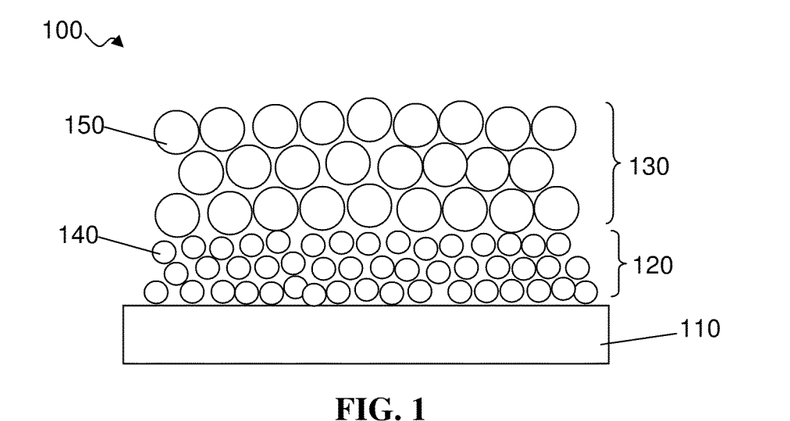
FIG. 1 is a schematic depiction of a coating on a surface.

Graded index coatings can be prepared by forming a first thickness of material on a substrate having a first refractive index. A second thickness of material, having a second refractive index is formed over the first thickness. FIG. 1 illustrates a surface 100 including substrate 110, first thickness 120 and second thickness 130. First thickness 120 includes nanoparticles 140, and second thickness 130 includes nanoparticles 150. Nanoparticles 140 can have a different size than nanoparticles 150. Differently sized nanoparticles can pack so as to have differing void volumes. Accordingly, thicknesses 120 and 130 have different effective refractive indices. Control over refractive index in each layer is achieved by selection of particle size, layer thickness, and particle material and functionalization.

Figure 4:
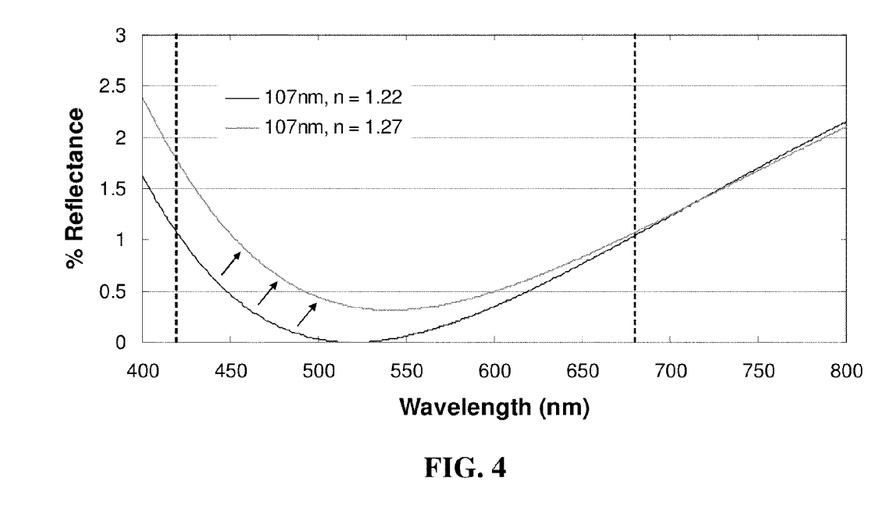
FIG. 4 is a graph depicting a simulation of the optimal single-layer antireflection coating on a substrate with refractive index of n~1.49.

A simulation of the optimal single-layer AR coating for a substrate of index ~1.49 (e.g., an epoxy lens) is shown in FIG. 4. The coating is 107 nm thick and has an index of ~1.22, which can be achieved using LbL assembly. The coating owes its extremely low refractive index to its high porosity, enabled by sparse packing of nanoparticles, which in turn leaves substantial void volume in the coating.

Figure 5A:
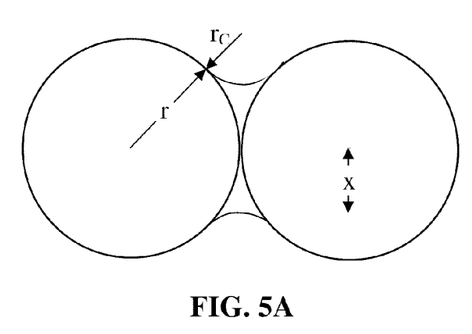
FIG. 5 is a schematic diagram showing how capillaries form at the junctions of nanoparticles.

Referring to FIG. 5A, a pressure difference exists across any curved interface (e.g., a liquid-solid interface) with a finite surface tension. The pressure difference between the interior and exterior of a nanoparticle is calculated in Eqn. 1:

$$\Delta P = 2\gamma^{NP-L}\left(\frac{1}{r}\right), \quad \text{(Eqn. 1)}$$

where $\gamma^{NP-L}$ is the surface tension of the nanoparticle-liquid interface and r is the nanoparticle radius. The pressure difference across the interface increases the chemical potential of the nanoparticle form compared to that of the same material in bulk form (i.e., at a flat interface), as described by Eqn. 2:

$$S^{NP} \cong S^{Bulk} \exp\left(\frac{2\gamma^{NP-L}V_m^{NP}}{RTr}\right), \quad \text{(Eqn. 2)}$$

where $S^{NP}$ and $S^{Bulk}$ are the solubilities of the nanoparticle and bulk form, respectively, of the relevant material, $V_m^{NP}$ is the molar volume of the nanoparticle material, R is the universal gas constant and T is temperature.

The regions between neighboring nanoparticles in a coating (i.e., pores) can behave as capillaries. A liquid condensed in such a pore (as illustrated in FIG. 5A) has a curved liquid-vapor interface, across which there is a pressure difference. This pressure difference is described by Eqn. 3:

$$\Delta P = \gamma^{Condensate}\left(\frac{1}{x} - \frac{1}{r_C}\right), \quad \text{(Eqn. 3)}$$

where $\gamma^{Condensate}$ is the surface tension of the condensate-vapor interface $r_C$ is the capillary radius and x is the internal diameter of the hourglass-shaped capillary condensate between nanoparticles (see FIG. 5A). The same pressure effect which increases the solubility of nanoparticles in solid-liquid equilibrium decreases the vapor pressure (and therefore volatility) of capillary condensates in a liquid-vapor equilibrium (Eqn. 4):

$$RT\ln\left(\frac{P_0^{Capillary}}{P_0}\right) = \gamma^{Condensate} V_m^{Condensate}\left(\frac{1}{x} - \frac{1}{r_C}\right), \quad \text{(Eqn. 4)}$$

where $P_0$ and $P_0^{Capillary}$ are, respectively, the equilibrium vapor pressures of the relevant liquid at planar and curved capillary liquid-vapor pressures; $\gamma^{Condensate}$ is the surface tension of the condensate; $V_m^{Condensate}$ is the molar volume of the condensate and x is the internal diameter of the hourglass-shaped capillary condensate between nanoparticles.

In other words, the liquid-vapor equilibrium shifts towards the liquid at a nanoparticle-nanoparticle capillary compared to at a flat liquid-vapor interface. Such curvature-induced condensation is called "capillary condensation."

Materials have lower vapor pressures in capillaries, and can therefore condense in capillaries under conditions where condensation does not occur on equivalent flat surfaces. The implication of capillary condensation for nanoporous films is that contaminants (including ambient water vapor) easily condense in sufficiently confined nanopores by virtue of the extremely small $r_{Capillary}$. Condensates increase the refractive indices of such films. Small changes in refractive index can drastically alter optical properties. For example, the refractive index of a single-layer AR film assembled LbL from PAH and 24 nm silica nanoparticles increased from ~1.22 to ~1.27 when stored at 37° C. 80% relative humidity (r.h.) for three days. The ensuing change in optical properties upon humidity aging is simulated in FIG. 4, where the upper curve represents the humidity-aged sample.

EXAMPLES

The low refractive index resulting from the porous nature of a PAH/SiO$_2$ multilayer films gave rise to anti-reflection properties see, for example, U.S. Patent Application No. 2007/0104922, which is incorporated by reference in its entirety. For a glass substrate with a refractive index of about 1.5, the maximum suppression of reflective losses occurs when a single layer (i.e., without a graded refractive index) anti-reflection coating has a refractive index of 1.22. The wavelength of maximum suppression is determined by the quarter-wave thickness of the coating. The quarter-wave thickness of a multilayer coating, in turn, can be tuned throughout the entire visible range and beyond by simply controlling the number of deposited bilayers. Measurements reveal (FIG. 2) that transmission levels in excess of 99% were achieved in the visible region (400 to 700 nm). For example, an 8 bilayer PAH 4.0/SiO$_2$ 4.0 multilayer film (thickness 97 nm) transmitted 99.6% of incident light at a wavelength of 490 nm. Without the anti-reflection coating, this glass transmitted about 92% of incident light. The ability of thin film coatings based on PAH/SiO$_2$ multilayers to effectively suppress reflective losses was further illustrated by multilayers assembled at PAH 7.5/SiO$_2$ 9.0 (FIGS. 3A-3B). At the optimum wavelength determined by the quarter-wave film thickness, reflective losses as low as about 0.1% and transmission levels of 99.7% were readily achieved. The wavelength range of maximum suppression for all of these films was much broader than what would be expected from a single index quarter-wave anti-reflection coating (determined by comparisons with optical simulations). This indicates that a gradient refractive index profile was established in the film as a result of the nano-corrugated surface topography. See, e.g, Hiller, J.; Mendelsohn, J.; Rubner, M. F. *Nature Mater.*, 2002, 1, 59, which is incorporated by reference in its entirety.

Figure 2:
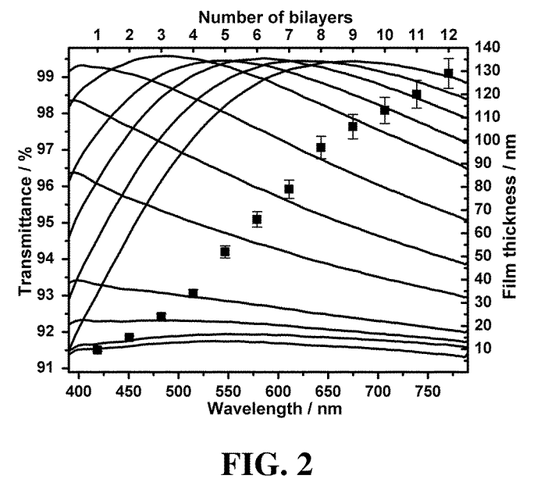
FIG. 2 is a graph depicting transmittance and thickness measurements for films having different numbers of bilayers.
Figure 3A:
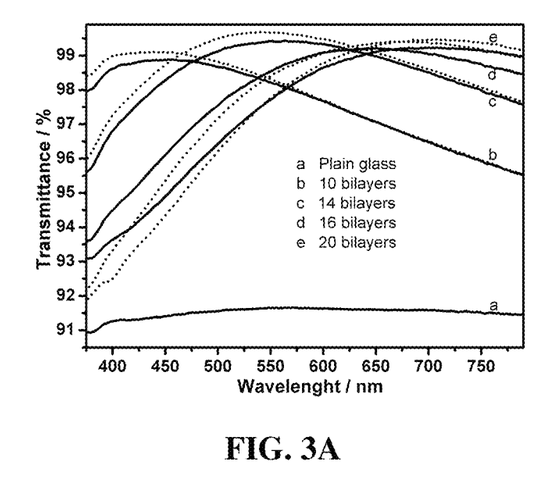
FIGS. 3A and 3B are graphs depicting transmittance and reflectance spectra for glass slides coated with polyelectrolyte multilayers.
Figure 3B:
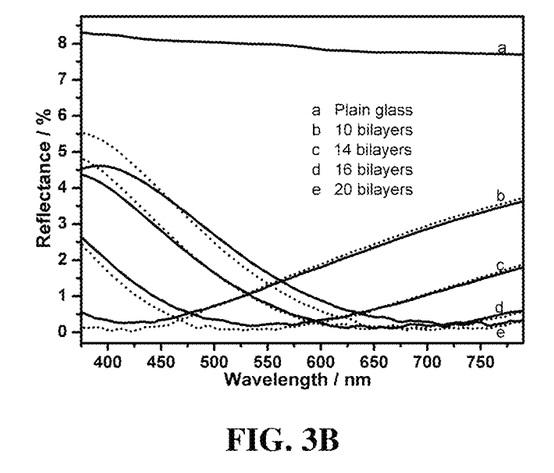

As indicated in FIGS. 2 and 3, the thickness per deposited bilayer in the case of PAH/SiO$_2$ multilayer films fabricated from 7 nm diameter SiO$_2$ nanoparticles was small enough to allow the fabrication of a family of films with quarter-wave thicknesses that span the entire visible range. This level of fine-tuning is more difficult to achieve with anti-reflection coatings based on a single layer of adsorbed silica nanoparticles. See, for example, Zhang, X-T.; et al. *Chem. Mater.* 2005, 17, 696; Hattori, H. *Adv. Mater.* 2001, 13, 51; Koo, H. Y.; et al. *Adv. Mater.* 2004, 16, 274; and Ahn, J. S.; et al. *Colloids and Surfaces A: Physicochem. Eng. Aspects* 2005, 259, 45, each of which is incorporated by reference in its entirety. In addition, these results showed that coatings containing many layers of very small nanoparticles were more effective at suppressing reflections than single layer coatings fabricated from larger nanoparticles (99.7% versus 98.8% transmission).

A key attribute of any practical anti-fogging/anti-reflection coating is excellent mechanical durability and adhesion. The PAH/SiO$_2$ multilayer films as-prepared adhered well and exhibited mechanical integrity, but could be rubbed off with aggressive mechanical action. The mechanical stability of these films, however, was increased tremendously by heating the film to about 500° C. for four hours. This calcination process burns out the polymer component of the film and fuses the silica nanoparticles together via the formation of stable siloxane bridges. See, for example, Unger, K. K., *Porous silica: its properties and use as support in column liquid chromatography*. Elsevier Scientific Pub. Co.: Amsterdam; N.Y., 1979; p xi, 336, which is incorporated by reference in its entirety. After this process, the resultant thin film coating was able to withstand aggressive rubbing treatments and easily passed a standard scotch tape peel test (some glue residue remained on the surface, but could be removed with solvents or plasma treatment). In addition, a negligible amount of the film was removed by scratching the surface with a razor blade. This process, of course, was only possible when the multilayer films are assembled on a substrate that can withstand this high treatment temperature.

The mechanical durability of nanoporous all-nanoparticle and polymer-nanoparticle layer-by-layer (LbL) films (80-150 nm thick) was increased on both glass and polycarbonate substrates via hydrothermal treatment at relatively low temperatures (124-134° C.) (see, e.g., Gemici, Z.; Shimomura, H.; Cohen, R. E.; Rubner, M. F. *Langmuir* 2008, 24, 2168-2177, and U.S. Patent Application Publication No. 2008/0038458, each of which is incorporated by reference in its entirety). Saturated steam can condense at the contact points between neighboring nanoparticles. The condensed water then catalyzes neck formation at the contact points via a dissolution-redeposition mechanism. The necking process has the same thermodynamic basis as Ostwald ripening: nanoparticles have enhanced solubilities (Eqn. 2), and dissolved species minimize their free energies by precipitating onto larger particles with sufficiently large radii of curvature. In nanoparticle assemblies, capillaries are available in between neighboring nanoparticles, where dissolved material deposits and forms necks.

Figure 6:
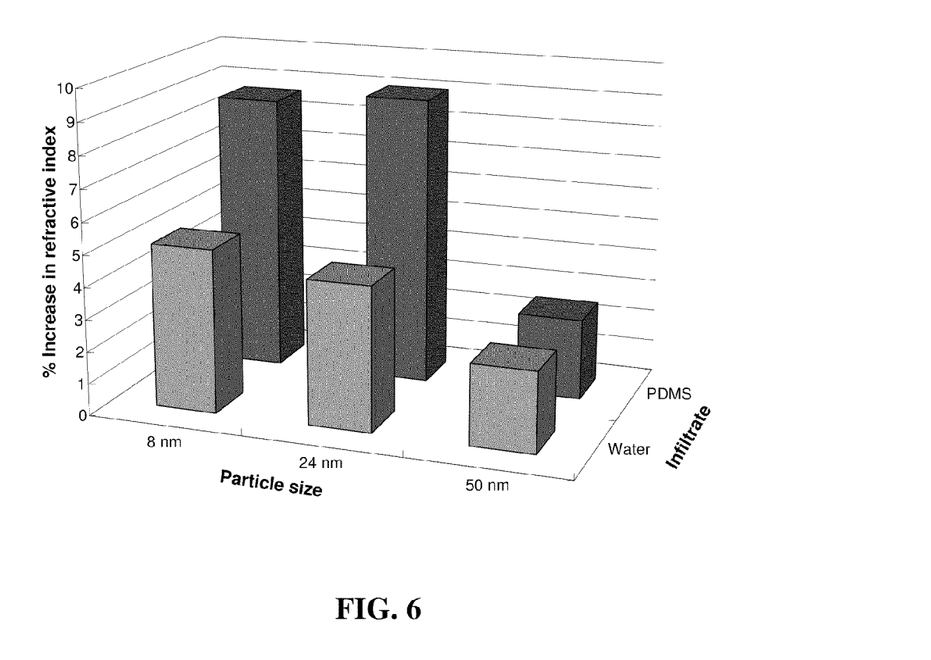
FIG. 6 is a graph depicting percent increase in refractive index in nanoparticle coatings (composed of various particle sizes) upon infiltration with water and PDMS (via capillary condensation).

Approximately 100 nm-thick coatings of various particle size distributions were made and these films were aged either in a humidity chamber at 37° C. 80% relative humidity for three days, or in either saturated poly(dimethyl siloxane) (PDMS) vapor or saturated tri(ethylene glycol) dimethyacrylate (TEGDMA) vapor at 100° C. for 20 hours. The percent increase in refractive index due to capillary condensation was measured (FIG. 6). Particles smaller than 50 nm in diameter were much more inductive of capillary condensation than were 50 nm particles. Water condensate increased the refractive index to a lesser extent than PDMS condensate. Most of this effect was probably due to the higher refractive index of PDMS (n~1.46) than water (n~1.33), difference in surface energy of silica and PDMS may also have added to the thermodynamic driving force for condensation of PDMS on the silica nanoparticle surfaces. In addition, the greater surface area/volume ratio in films made of smaller particles provides necessary space for condensation.

Figure 7:
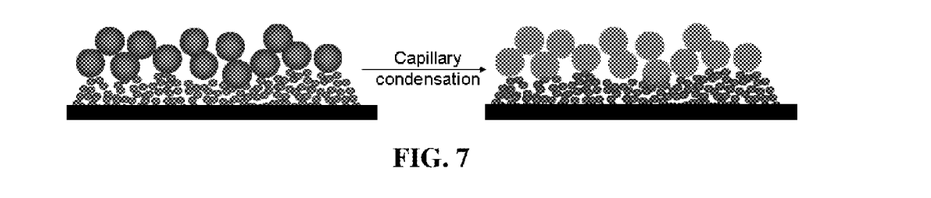
FIG. 7 is a schematic diagram illustrating differential capillary condensation in different regions of a coating having nanoparticles of different sizes.

The LbL assembly technique allows compositional control as a function of coating thickness, as well as control of overall thickness. Different coatings can be assembled on top of each other to obtain multilayer structures. An LbL film including 50 nm silica particles was assembled on top another LbL film including 8 nm silica particles, such that the total film thickness was 90-200 nm. When this structure was exposed to PDMS or water vapor, capillary condensation occurred in both stacks, albeit with greater impact on the refractive index of the stack made of smaller nanoparticles. Therefore, the graded particle size distribution achieved using LbL assembly can be extended to a graded refractive index profile by exploiting thermodynamic capillarity effects (FIG. 7).

Figure 5B:
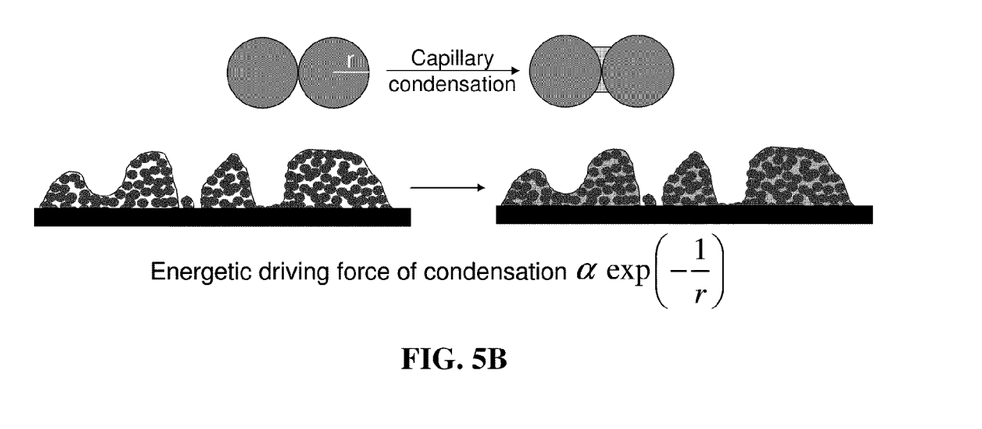
Figure 8A:
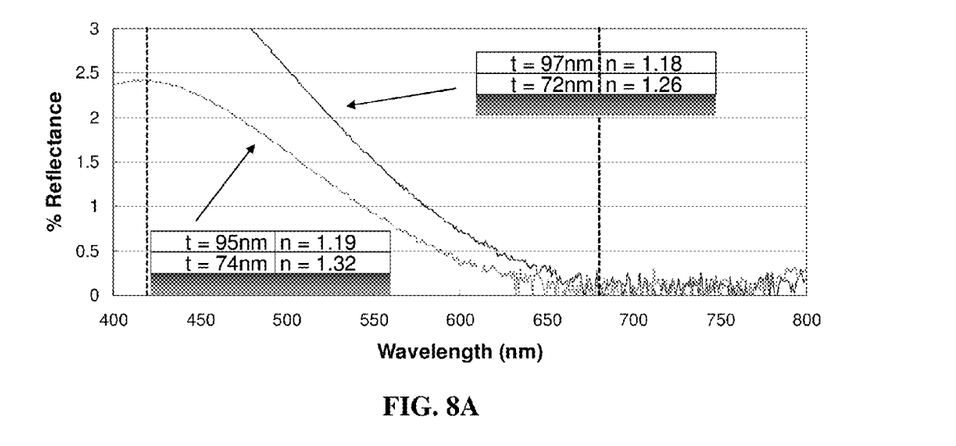
FIGS. 8A and 8B are graphs illustrating reflectance curves for coatings having a two-stack design after infiltration with water (FIG. 8A) and PDMS (FIG. 8B). Optical properties of the as-assembled (non-infiltrated, non-functionalized) structures are also provided for reference.
Figure 8B:
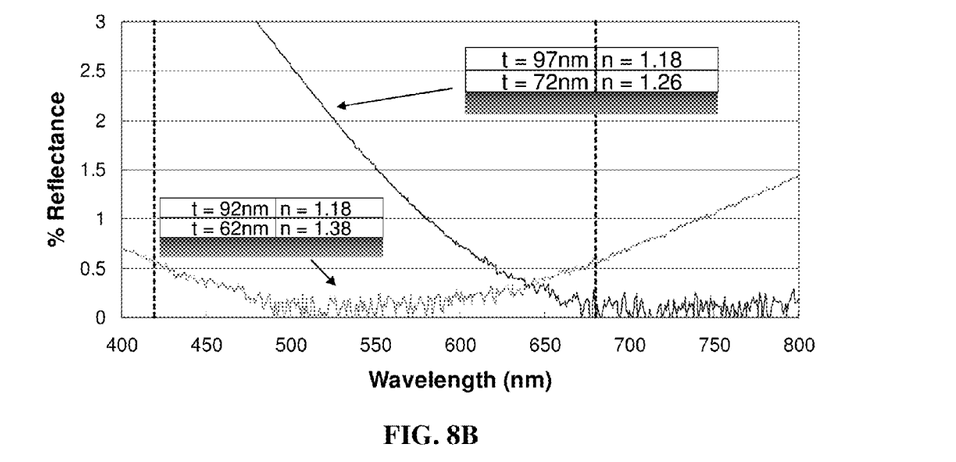
Figure 9:
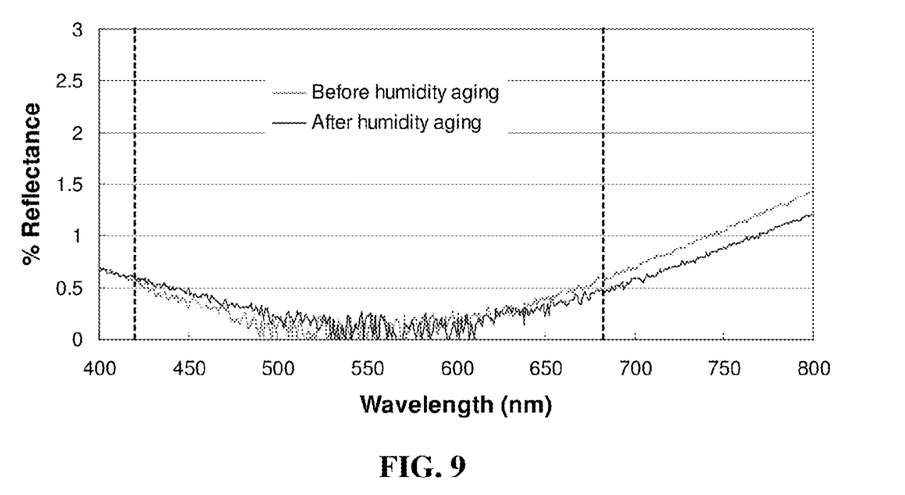
FIG. 9 is a graph depicting a PDMS-infiltrated, two-stack AR film before and after aging in a humidity chamber (37° C., 80% r.h.) for 60 hours.

The reflectance curves of such a 2-stack film before and after capillary condensation of water and PDMS vapor are shown in FIGS. 8A-8B. The AR performance of the PDMS-infiltrated graded-index coating was superior to the optimal single-layer AR coating shown in FIG. 5, and was unaffected by storage at 37° C. 80% r.h. for 60 hours (FIG. 9).

Figure 10A:
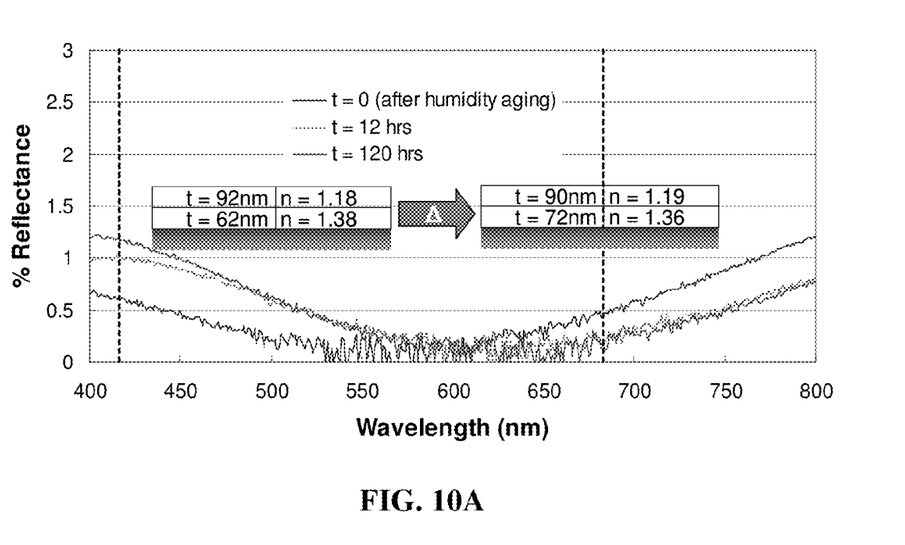
FIGS. 10A-10B are graphs depicting optical properties of a PDMS-infiltrated 2-stack AR films before and after prolonged heating at 85° C., where the total film thicknesses as measured using spectroscopic ellipsometry are ~150 nm (FIG. 10A) and ~120 nm (FIG. 10B).
Figure 10B:
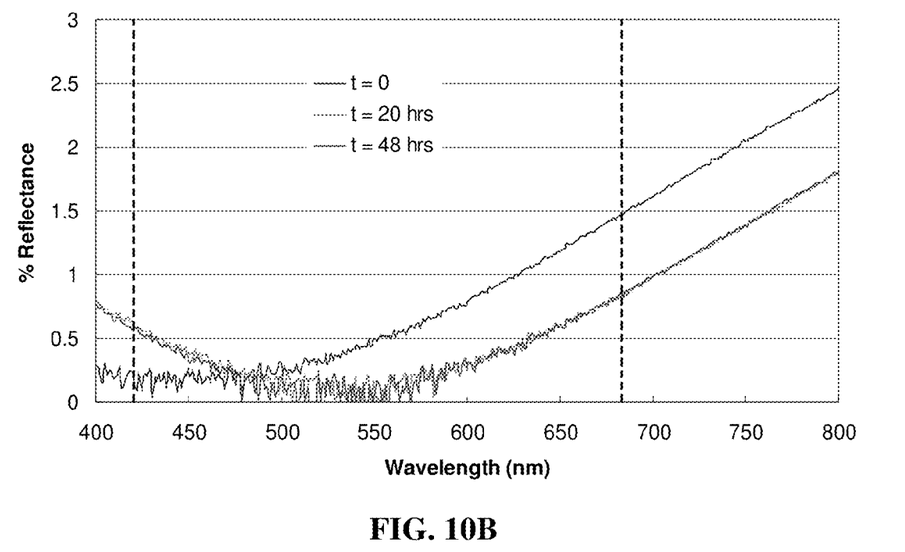

PDMS condensed inside the films was fully retained at 37° C., but the equilibrium amount of retained PDMS is expected to decrease with increasing storage temperature. Nevertheless, temperature-induced desorption of PDMS should stop once equilibrium is reached according to equation (1). For example, the refractive index profile changed somewhat within the first 12 hours of storage at 85° C. (FIGS. 10A-10B). However, the index profile changes minimally (if at all) once the new equilibrium was reached. If the temperature were reduced back to room temperature, no more PDMS would be expected to desorb and no more water vapor would be expected to adsorb, due to the hydrophobic nature of the surface.

The total film thickness plays an important role in determining the position of the reflectance minimum along the x-axis (wavelength). As-assembled, the 2-stack film behaves similar to a single-layer AR film, due to the small index contrast between the two stacks. Therefore, the reflectance minimum was positioned close to four times the optical thickness. PDMS condensation enhanced index contrast between the two stacks and shifted the reflectance minimum to a lower wavelength. Any change in the refractive indices of the two stacks that decreased the index contrast moves the reflectance minimum to higher wavelengths, closer to its original position. The two films shown in FIGS. 10A and 10B, for example, have different thicknesses and their reflectance minima "relax" to different wavelengths when the new equilibrium is reached at 85° C.

Figure 11:
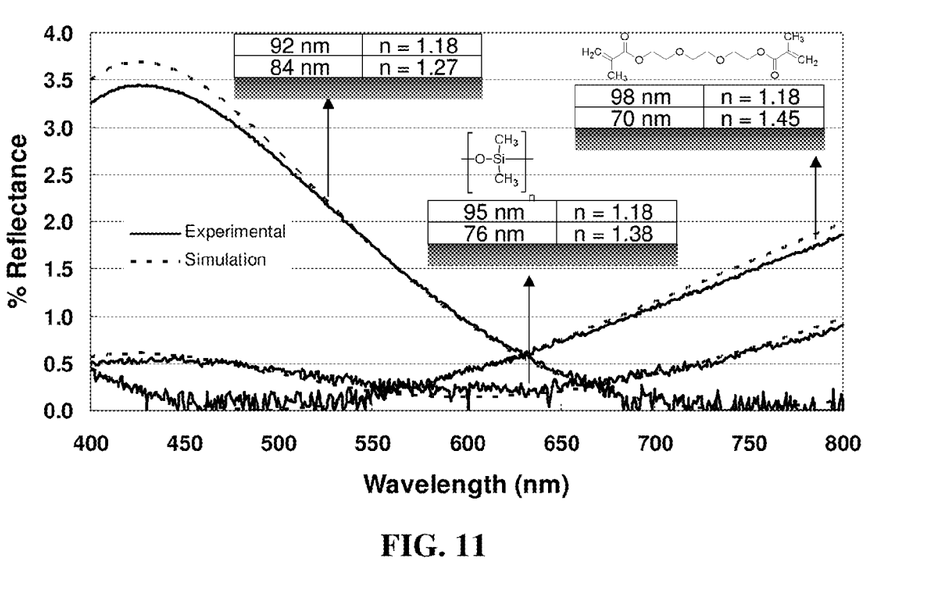
FIG. 11 is a graph comparing the optical properties of as-assembled, PDMS-infiltrated, and PEGDMA-infiltrated two-stack AR film.

Reflectance spectra and refractive index profiles of as-assembled (blue), PDMS-functionalized (pink), and tri(ethylene glycol) dimethacrylate (TEGDMA)-functionalized (yellow) coatings are plotted in FIG. 11. The experimental spectra were simulated with good accuracy (black curves). TEGDMA has a higher refractive index than PDMS, and this difference was observed in the refractive indices of the bottom layers. Note that the top layers in all three coating types were substantially identical, because the extent of capillary condensation in top layer was negligible.

Figure 12A:
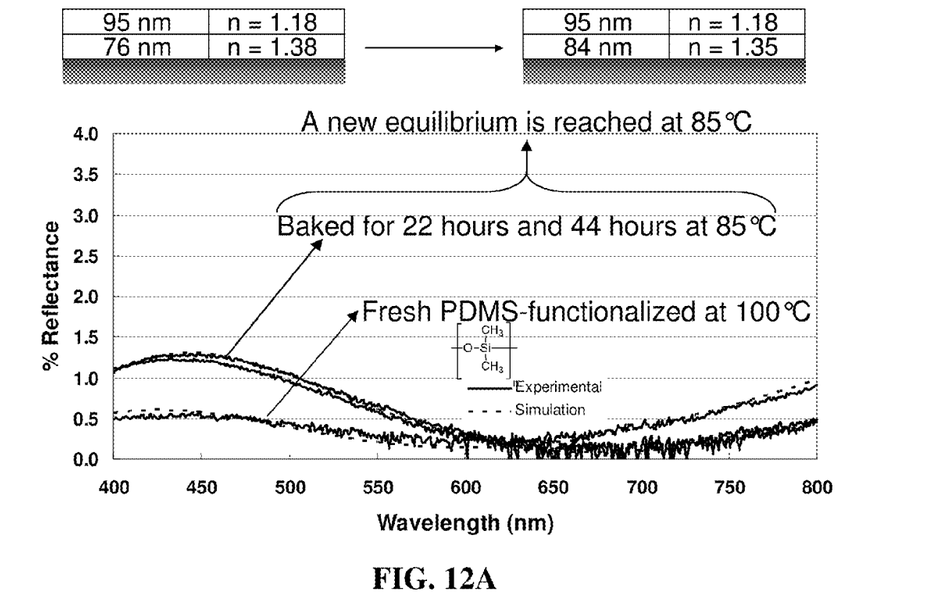
FIGS. 12A-12B are graphs depicting optical properties of PDMS- and TEGDMA-infiltrated two-stack AR films, before and after heating at 85° C. for 22 hours and 44 hours, where no significant changes occur between 22 hours and 44 hours (indicating that a new thermodynamic equilibrium is reached).
Figure 12B:
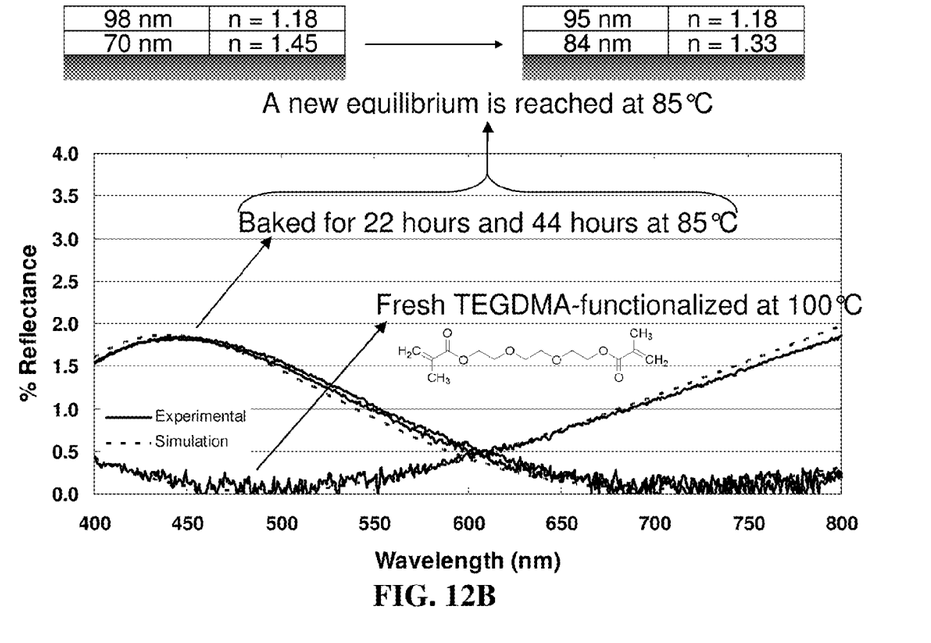
Figure 13:
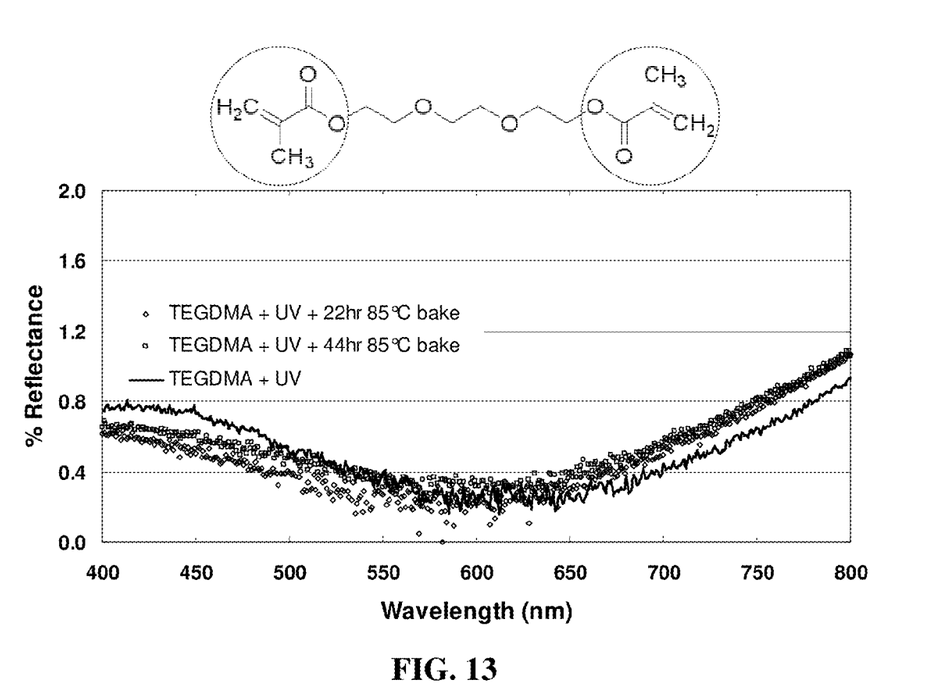
FIG. 13 is a graph depicting the changes (or lack thereof) in the optical properties of a TEGDMA-infiltrated and subsequently UV-crosslinked two-stack AR film upon prolonged (22 hour and 44 hour) heating at 85° C., demonstrating that infiltrated functional chemicals can be further reacted in situ.

Results of a dry heating test are shown in FIGS. 12A and 12B for PDMS- and TEGDMA-functionalized coatings, respectively. A new equilibrium is reached within 22 hours, and some (but not all) of the condensate which is stable at 25° C. evaporates from the coating at 85° C. TEGDMA can be photocrosslinked by virtue of the methacrylate functionalities. TEGDMA-functionalized and subsequently UV-crosslinked AR coatings show essentially no change in their optical properties upon dry baking (FIG. 13).

However, because water (n~1.33) has a lower index of refraction than PDMS (~1.46), the index contrast and therefore antireflective properties are suboptimal in moisture-soaked coatings.

The organic-inorganic composite nature of the coating material can reduce the mismatch between the thermal expansion coefficients of the substrate and the coating, thereby rendering it more resistant to cracking. The thinness of the coating compared to other coatings of comparable optical performance is also advantageous in terms of avoiding cracking.

On cleaned glass slides, 3-aminopropyl silane-modified $SiO_2$ nanoparticles (15 nm diameter) and PAA polymer were deposited at pH 3.00. After 8 bilayers of coating were deposited, the film was calcinated at 550° C. for 2 hr. Calcinated films were coated with $TiO_2$ (diameter=7 nm) and poly(vinyl sulfate) at pH 2.00 After 50 or 60 bilayers of coating were deposited, films were calcinated at 550° C. for 2 hr. For infiltration, calcinated silica/titania stack slides were placed in a vial containing either PDMS (MW:1300, n~1.46) or $CH_2I_2$ (n=1.74) at 100° C. for 20 hr. Results are displayed in the Table below.

| Layer | Before infiltration | | | PDMS infiltration | | | $CH_2I_2$ infiltration | | |
|---|---|---|---|---|---|---|---|---|---|
| | n, 630 nm | d (nm) | Void volume (%) | n, 630 nm | d (nm) | Void volume (%) | n, 630 nm | d (nm) | Void volume (%) |
| $SiO_2$ | 1.27 | 80 | 48 | 1.45 | 81 | 0 | 1.57 | 81 | 3 |
| $TiO_2$ | 2.05 | 57* | 24 | 2.05 | 57 | 24 | 2.12 | 64 | 19.5 |

*Sample for $CH_2I_2$ infiltration had 61 nm titania layer before infiltration.

The results indicated that PDMS and $CH_2I_2$ filled the voids in silica layer by penetrating through titania layer. A relatively small amount condensed in the titania layer voids.

Other embodiments are within the scope of the following claims.

What is claimed is:

1. A surface comprising a nanoporous coating including a first thickness including a first plurality of nanoparticles having a first diameter and having a first porosity and a second thickness including a second plurality of nanoparticles having a second diameter different from the first diameter and having a second porosity different from the first porosity, the coating including:
   a first functionalizing compound present in the first porosity as a capillary condensate,
   a second functionalizing compound present in the second porosity as a capillary condensate,
   wherein the first and second functional compounds are different, wherein the coating has a thickness of less than 500 nm wherein the first functionalizing compound is a polymer or a polymer precursor capable of forming a capillary condensate in capillary interstices, and wherein pores in the first thickness are formed between the first plurality of nanoparticles and pores in the second thickness are formed between the second plurality of nanoparticles.

2. The surface of claim 1, wherein the coating has a thickness of less than 300 nm.

3. The surface of claim 1, wherein the surface is transparent.

4. The surface of claim 1, wherein the first functionalizing compound is substantially absent from the second porosity.

5. A surface comprising a nanoporous coating including a preselected porosity and a preselected first functionalizing compound and a preselected second functionalizing compound, the first and second functionalizing compounds being capillary-condensed within the porosity, wherein the nanoporous coating includes a plurality of inorganic nanoparticles having capillary interstices among the nanoparticles and the coating has a thickness of less than 500 nm, wherein the first functionalizing compound is a polymer or a polymer precursor capable of forming a capillary condensate in capillary interstices, wherein the second functionalizing compound is a polymer or a polymer precursor capable of forming a capillary condensate in capillary interstices, and wherein the first and second functional compounds are different.

* * * * *